United States Patent
Steffes et al.

[19]

[11] Patent Number: 6,149,250
[45] Date of Patent: Nov. 21, 2000

[54] HYDRAULIC BRAKE SYSTEM WITH A PRIMING PUMP FOR MOTOR VEHICLES

[75] Inventors: Helmut Steffes, Hattersheim; Gottfried Dehio, Hanau; Peter Volz, Darmstadt, all of Germany

[73] Assignee: ITT Manufacturing Enterprises, Inc., Wilmington, Del.

[21] Appl. No.: 09/029,382

[22] PCT Filed: Aug. 13, 1996

[86] PCT No.: PCT/EP96/03571

§ 371 Date: May 19, 1998

§ 102(e) Date: May 19, 1998

[87] PCT Pub. No.: WO97/09213

PCT Pub. Date: Mar. 13, 1997

[30] Foreign Application Priority Data

Sep. 2, 1995 [DE] Germany .......................... 195 32 469
Jan. 17, 1996 [DE] Germany .......................... 196 01 418

[51] Int. Cl.[7] ................. B60T 8/40; B60T 8/42; B60T 8/48
[52] U.S. Cl. ............... 303/116.1; 303/900; 303/113.2
[58] Field of Search ............. 303/113.2, 113.3, 303/900, 901, 116.1, 116.2, 139, 135, 125, 119.1, 115.1–115.6, 189, DIG. 10, 188, 87; 188/181 R

[56] References Cited

U.S. PATENT DOCUMENTS

| | | | |
|---|---|---|---|
| 4,773,715 | 9/1988 | Farr | 188/181 R |
| 4,787,684 | 11/1988 | Schonlau et al. | |
| 5,255,962 | 10/1993 | Newhaus et al. | 303/188 |
| 5,342,120 | 8/1994 | Zimmer et al. | 303/113.2 |
| 5,429,425 | 7/1995 | Drott | 303/116.3 |

FOREIGN PATENT DOCUMENTS

| | | |
|---|---|---|
| 3824877 | 2/1989 | Germany . |
| 3839178 | 8/1989 | Germany . |
| 4009640 | 6/1991 | Germany . |
| 4037468 | 5/1992 | Germany . |
| 4412650 | 10/1995 | Germany . |

*Primary Examiner*—Douglas C. Butler
*Attorney, Agent, or Firm*—Rader, Fishman & Grauer PLLC

[57] ABSTRACT

To prevent difficulties in a brake system which is appropriate for automatic braking operations when the viscosity of the pressure fluid is high at low temperatures, a precharging pump for the pressure fluid supply during automatic braking is located so that it aspirates pressure fluid from the supply reservoir and delivers it into the brake line at a junction point as far from the master cylinder as possible. This junction point should be as close as possible to the suction side of the return pump. The large distance between the master cylinder and the point where the pressure line opens into the brake line makes it unnecessary to provide additional throttle elements in the brake line in order to reliably prevent pressure fluid from discharging into the supply reservoir. Only when the change-over valve on the suction side of the return pump is closed after an automatic braking operation has ended will it be necessary to reduce the residual pressure because the precharging pump continues running. This reduction in residual pressure takes place automatically in the brake system of the present invention because the pressure fluid connection to the master cylinder and, thus, to the supply reservoir is open.

5 Claims, 4 Drawing Sheets

6,149,250

HYDRAULIC BRAKE SYSTEM WITH A PRIMING PUMP FOR MOTOR VEHICLES

BACKGROUND OF THE INVENTION

The present invention is based on a hydraulic automotive vehicle brake system with a return pump and a precharging pump. Concepts of this type are frequently used where the objective is to retrofit a device for automatic braking to brake systems operating according to the return principle for anti-lock control. Automatic braking, on the one hand, refers to traction slip control operations where brake management is only performed by the wheel brakes of the driven wheels or, on the other hand, to a control of the yaw torque of the vehicle by brake management on individual vehicle wheels. In addition, automatic braking refers to a retardation of a vehicle for defined reasons, for example, in the event of a sensor triggering an alarm signal which indicates a too small distance from a vehicle ahead, and like events.

In brake systems operating according to the return principle for anti-lock control, the return pump used is frequently of the self-priming type in order to permit automatic aspiration of pressure fluid from the pressure fluid supply reservoir for automatic braking operations. At low temperatures, however, the viscosity of the pressure fluid used, i.e., brake fluid, is high so that it is very difficult for the return pump to provide the necessary suction capacity.

Sharp throttling effects are caused by the master cylinder when fluid is aspirated from the supply reservoir by way of the brake line and the master cylinder. In addition, a pressure gradient is involved with long pipe lines and bores.

Therefore, it has frequently been disclosed to use a precharging pump. Partly, the return pumps in brake systems of the above type are not of the self-priming type. Partly, however, the precharging pump has only a supporting effect, and the return pump remains the self-priming type.

There are different proposals how to connect the pressure side of the precharging pump to the suction side of the return pump. It must be ensured in any case that the pilot pressure generated by the precharging pump will propagate to the suction side of the return pump and is prevented from discharging into an unpressurized reservoir. Also, the reduction of residual pressure must be ensured when the pumps are disconnected. A frequent problem encountered is that the precharging pump continues running even after its disconnection, with the result that additional valves are required which are opened to discharge the developing residual pressure.

An object of the present invention is to provide a brake system of the type mentioned hereinabove having a precharging concept which is simple and inexpensive, but operates effectively.

SUMMARY OF THE INVENTION

This object is achieved by connecting the pressure line of a precharging pump to the brake line with a flow connection to the master cylinder at a junction point that is so remote from the master cylinder that a sufficient pilot pressure for the return pump develops due to throttling effects which are caused in the brake line between the junction point and the master cylinder. No valves are required for the reduction of residual pressure by arranging the pressure line so that it opens into the brake line directly before or within the hydraulic control unit. This is because the pressure side of the precharging pump, by way of the brake line, is permanently connected to the supply reservoir when the master cylinder is not operated. On the other hand, the pipe connection from the master cylinder to the hydraulic control unit is so long that this line alone is sufficient to throttle the pressure fluid flow from the pressure side of the precharging pump to such an extent that the largest portion is conducted to the suction side of the return pump.

A separating valve in the brake line to disconnect a pressure fluid flow to the master cylinder is only necessary between the pressure side of the return pump and the master cylinder. The pressure line of the precharging pump can open into the brake line between the separating valve and the master cylinder.

In order to separate the residual pressure from the return pump in the case of after-running of the precharging pump, it is sufficient to use an electric change-over valve (which is conventional in self-priming return pumps) on the suction side of the return pump.

A brake system of this type becomes especially inexpensive when both brake circuits use a common precharging pump. To separate the circuits, a non-return valve is arranged in each of the pressure branches leading to the brake circuits.

However, when the precharging pump has a dual-circuit design, so that the brake circuits are precharged by separate pressure lines, this arrangement implies enhanced safety. Upon failure of a non-return valve in one of the pressure lines, the pressure fluid in the associated brake circuit will be discharged into the unpressurized supply reservoir rather than into the other brake circuit. Thus, a separation of the circuits is ensured even upon failure of a non-return valve. In this pump design, an electronic monitoring unit is able to quickly identify a defective non-return valve, so that stealthy defects are prevented.

The idea of the present invention will be explained in detail hereinbelow by the description of preferred embodiments, making reference to four Figures.

DETAILED DESCRIPTION OF THE DRAWINGS

Figure 1:
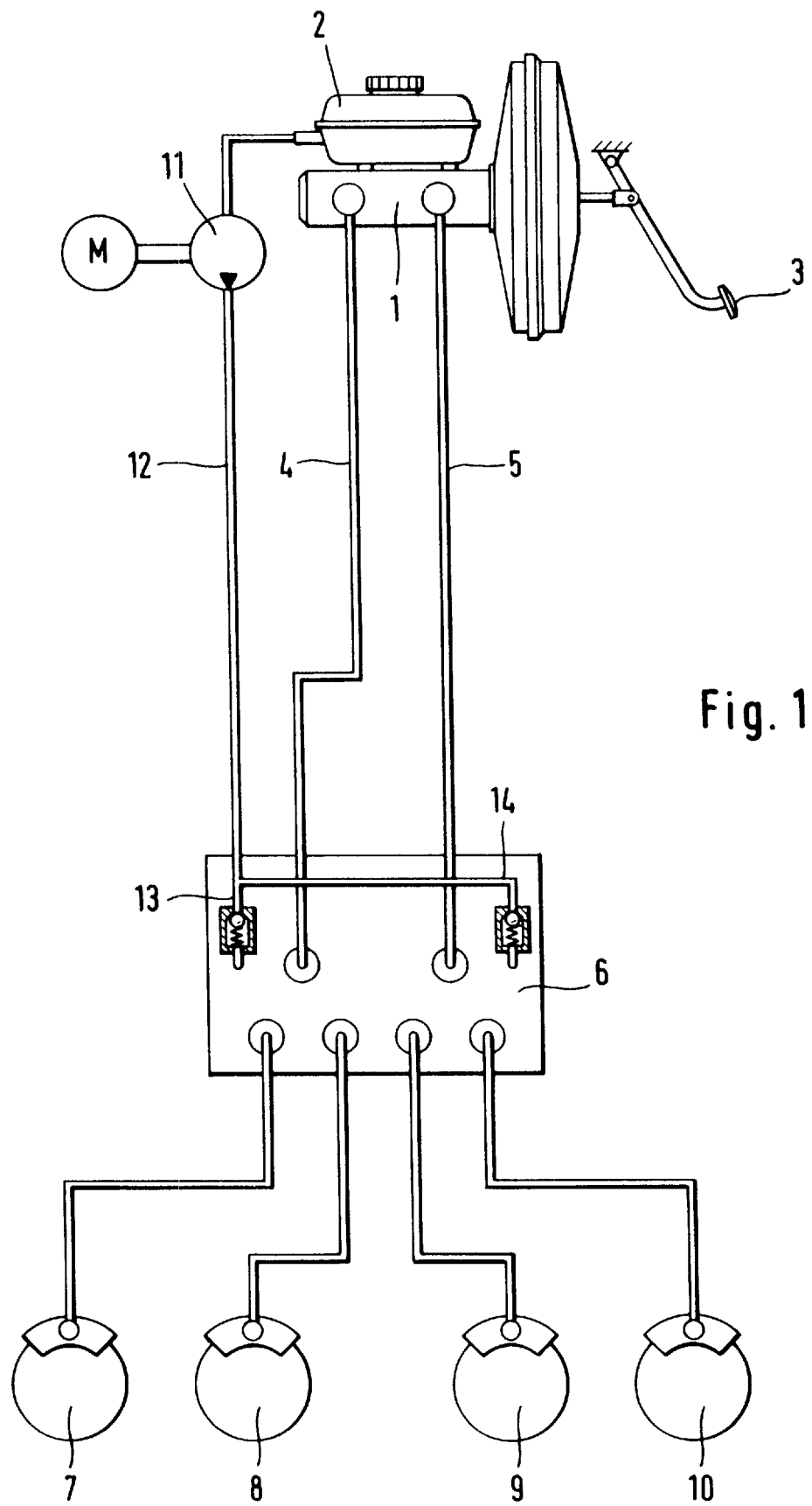
FIG. 1 is a block diagram relating to the idea of the present invention including a one-circuit precharging pump.

FIG. 1 shows only a few function elements which are conducive to comprehending the idea of the invention. A master cylinder 1 is connected to a supply reservoir 2 and operable by a brake pedal 3. Two brake lines 4 and 5 extend from the master cylinder 1. The brake lines lead to a hydraulic control unit 6 to which four wheel brakes 7 to 10 are connected. A precharging pump 11 is connected with its suction side to the supply reservoir 2 and has a pressure line 12 which extends to the hydraulic control unit 6. Pressure line 12 is subdivided into a pressure line 13 and 14 per brake circuit, i.e., for brake line 4 or 5. The hydraulic control unit 6 includes an inlet valve and an outlet valve for each wheel brake, and one return pump, one low-pressure accumulator and damping elements, one separating valve and one change-over valve on the suction side of the return pump for each brake circuit. The point where the two pressure lines 13 and 14 open into the respective brake line 4 or 5 is so far remote from the master cylinder 1, i.e., within the hydraulic control unit 6, that the pipe connection which provides the brake line 4 or 5, respectively, has a throttling effect to the end that the pilot pressure generated by the precharging pump 11 is prevented from propagating to the master cylinder 1. Therefore, the brake lines 4 and 5 require neither additional orifices or throttles nor valves which produce a dynamic pressure in the brake lines.

Figure 2:
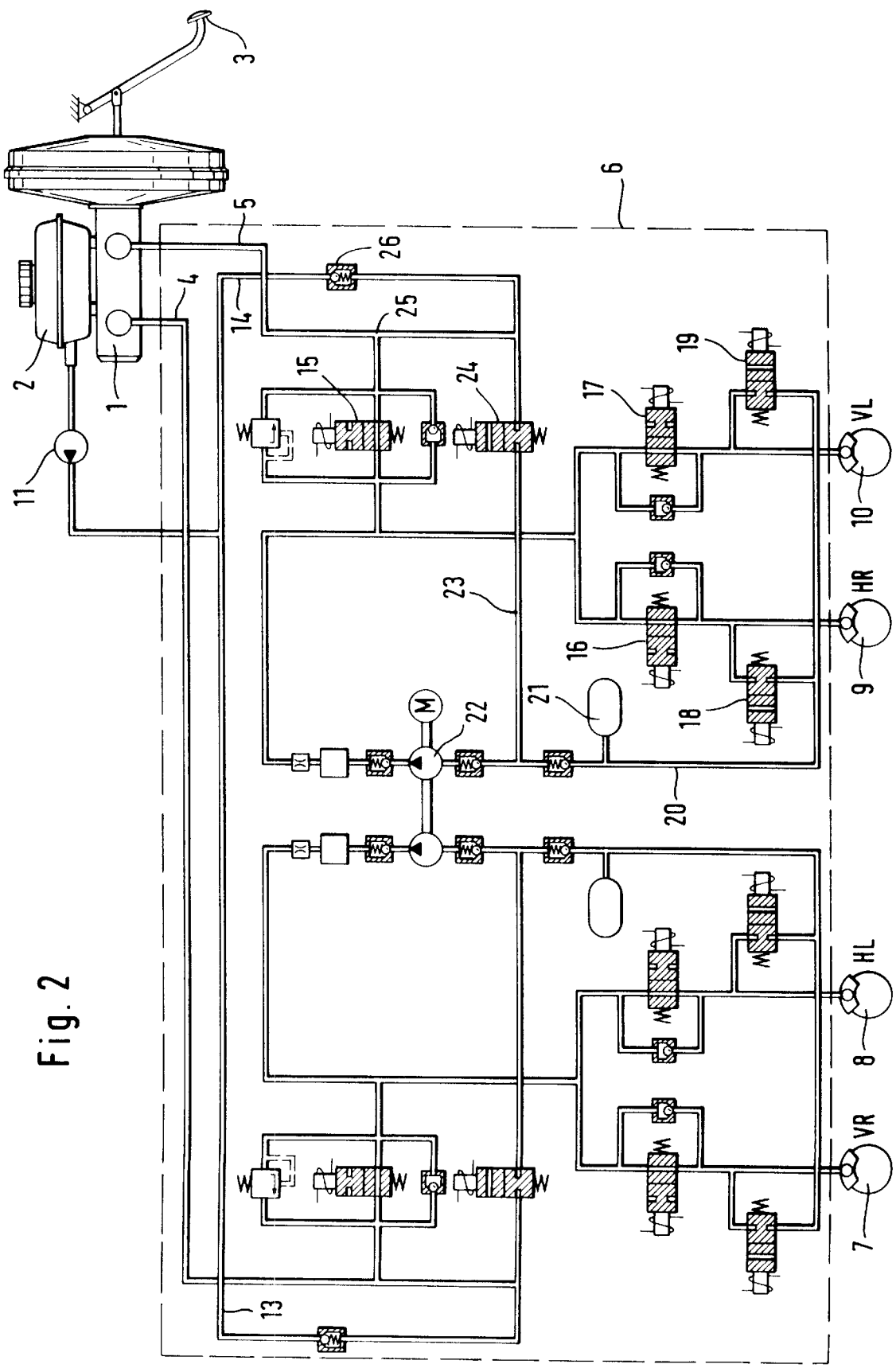
FIG. 2 is a view of an embodiment of a brake system of the present invention according to FIG. 1.

While FIG. 1 roughly illustrates the space conditions, FIG. 2 shows the hydraulic line connections also inside the hydraulic control unit. In the embodiment of FIG. 2, however, the proportions of the individual line lengths are not correctly sized for reasons of clarity.

The master cylinder 1, the supply reservoir 2, the brake pedal 3, the brake lines 4 and 5, the precharging pump 11, the pressure lines 13 and 14, and the wheel brakes 7, 8, 9, and 10 are identical with the elements in FIG. 1 which have the same reference numerals. The function elements included in the hydraulic control unit 6 have a dotted frame. In a real brake system, the distance between the master cylinder 1 and the hydraulic control unit 6 is substantially longer than in this illustration.

The two brake circuits have an absolutely identical design inside the hydraulic control unit 6. Therefore, only the brake circuit supplied with fluid by the brake line 5 is described in the following.

The brake line 5 extends over a separating valve 15 to the inlet valves 16 and 17 of the wheel brakes 9 and 10. A return line 20 is connected to the wheel brakes 9 and 10 by way of the outlet valves 18 and 19 associated with the wheel brakes 9 and 10. Return line 20 leads to a low-pressure accumulator 21 which is connected to the suction side of the return pump 22. A suction line 23 is connected to the connection between the low-pressure accumulator 21 and the return pump 22. Line 23 extends to the brake line 5 between the master cylinder 1 and the separating valve 15 by way of a change-over valve 24. Pressure line 14 is connected to the suction line 23 between the junction point 25 to the brake line 5 and the separating valve 24. Inserted in the pressure line 14 is a non-return valve 26 which prevents a pressure fluid exchange between the two brake lines 4 and 5 because the pressure line 13, along with the pressure line 14, is fed with fluid by the precharging pump 11 and connected entirely analogously to the brake line 4. The pressure side of the return pump 22 is connected in a known fashion to the brake line 5 between the separating valve 15 and the inlet valves 16 and 17. The change-over valve 24 is a normally closed two-way/two-position solenoid valve. The effect is that, in the deenergized position of the change-over valve, the suction side of the return pump 22 is separated from the brake line 5, but not the pressure side of the precharging pump 11. When the master cylinder is not operated, the fluid volume which is excessively furnished by the precharging pump after deactivation of automatic braking can be discharged, even though only gradually, into the master cylinder 1 and, thus, into the supply reservoir 2 by way of the pressure line 14, the junction point 25 and the brake line 5. Further pressure build-up on the suction side of the return pump 22 can be prevented by the change-over valve 24.

Because the change-over valve 24 is open and the separating valve 15 is closed in automatic braking operations, it is ensured, on the one hand, that the return pump 22 delivers its high supply pressure to the inlet valve rather than into the brake line. On the other hand, it is ensured by the very long brake line 5 and the comparatively very short connection to the suction side of the return pump 22 that a sufficient pilot pressure for the return pump 22 is available in automatic braking operations.

A precharging concept of this type involves major advantages. For example, the need for a means for pressure limitation on the precharging pump (such as a pressure-limiting valve or an orifice) is eliminated. Besides, an orifice in the state of the art is used for the reduction of residual pressure which, in this case, is effected through the brake line 5 which does not require additional throttle elements. The master cylinder and the supply reservoir may be of the standard type. The residual pressure produced by the after-running of the precharging pump 11 can be separated from the return pump 22 by closing the change-over valve 24 and is discharged through the brake line. Due to the short distance from the suction side of the return pump, compared to the long brake line, the required output of the precharging pump rises only slightly in comparison with a precharging pump having a pressure side which is entirely separated from the master cylinder.

Figure 3:
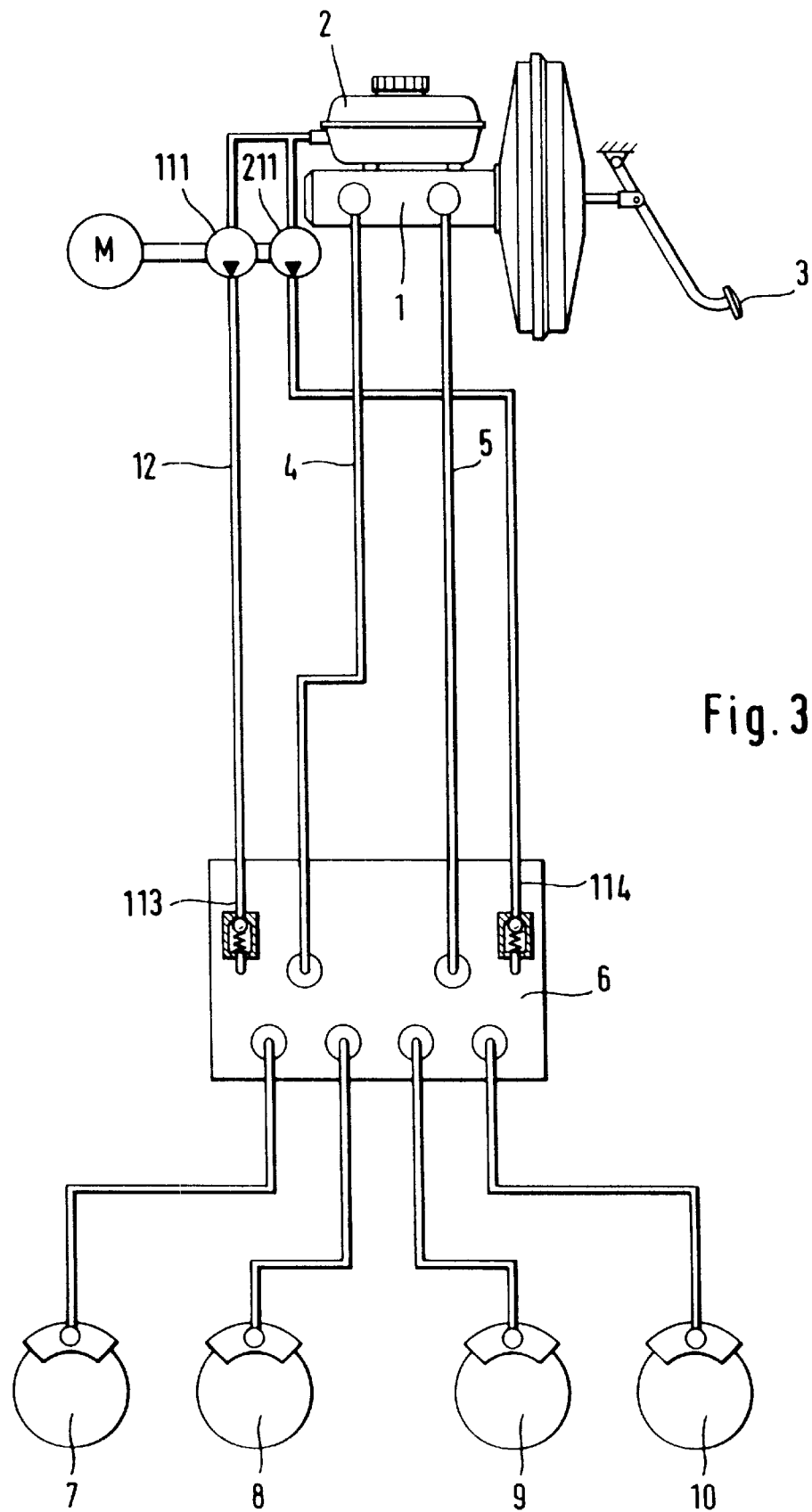
FIG. 3 is a block diagram relating to the idea of the present invention including a dual-circuit precharging pump.

Analogously to FIG. 1, FIG. 3 shows a block diagram, however, with the provision of a dual-circuit precharging pump 111/211 which is driven by a joint motor M. Function elements which are identical to those in FIG. 1 have been designated like reference numerals. The same advantages as in the embodiment of FIG. 1 are achieved by the long brake lines 4 and 5.

Figure 4:
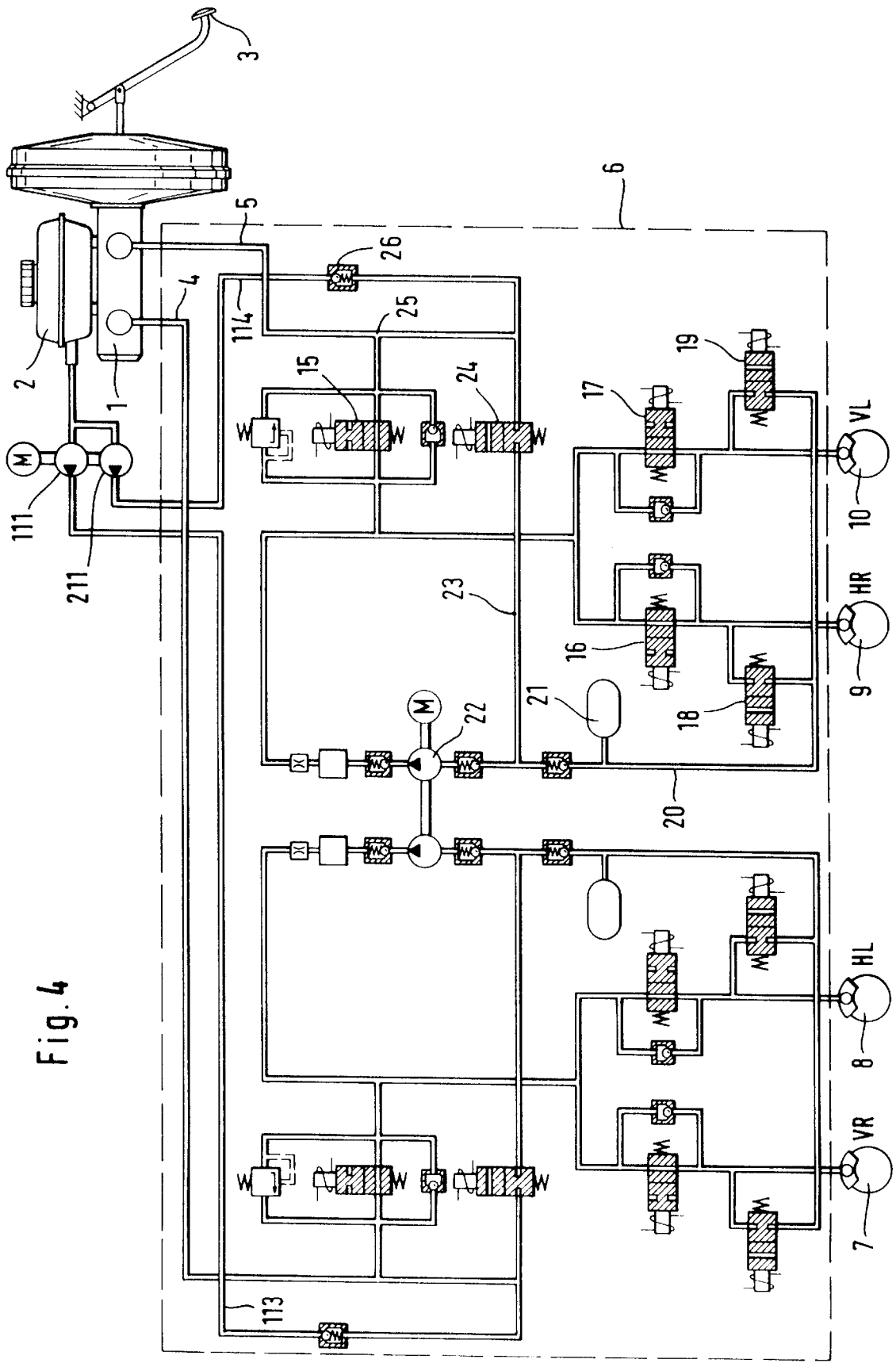
FIG. 4 is a view of an embodiment of a brake system of the present invention according to FIG. 3.

Further, it can be seen in FIG. 4, the style of which is identical with FIG. 2, that the pressure lines 113 and 114 do not get into contact with each other. Therefore, it is prevented that the two brake circuits get mixed, even in the event of a defect of any one of the non-return valves interposed in the pressure lines. The pressure fluid escaping, for example, through a defective non-return valve 26, discharges into the supply reservoir 2 through the part 211 of the dual-circuit precharging pump which charges this pressure line. Stealthy defects are avoided because such defects can be easily recognized. All other function elements correspond to those in FIG. 2.

What is claimed is:

1. A hydraulic automotive vehicle brake system comprising:

a pedal-operated master cylinder connected to a supply reservoir; at least one brake circuit including at least one brake wheel, wherein at least one wheel brake is connected to the master cylinder by way of a brake line; a return pump for each brake circuit with a suction side and a pressure side which returns pressure fluid discharged from the wheel brake in an anti-lock control operation into the brake line; and a precharging pump with a suction side and a pressure side which generates a pilot pressure on the suction side of the return pump during automatic braking operations, wherein the pressure side of the precharging pump includes a pressure line means for connecting the pressure line to the master cylinder without any intervening valve components positioned therebetween, wherein the pressure line means is hydraulically coupled into the brake line at a junction point that is so remote from the master cylinder that a sufficient pilot pressure for the return pump develops due to throttling effects which are caused in the brake line between the junction point and the master cylinder.

2. A brake system as claimed in claim 1, wherein a hydraulic control unit, which accommodates, among others, inlet and outlet valves associated with at least one wheel brake and the return pump, also includes the junction point.

3. A brake system as claimed in claim 1, wherein the junction point is arranged between the master cylinder and a separating valve interposed between the pressure side of the return pump and the master cylinder, and a suction line of the return pump extends from the pressure line to the suction side of the return pump.

4. A brake system as claimed in claim 3, wherein the suction line includes a two-way/two-position change-over valve.

5. A brake system as claimed in claim 1, wherein two brake circuits are provided, and one precharging pump which is common to both of the brake circuits has a pressure line which is split into two pressure lines, one for each brake circuit.

* * * * *